United States Patent [19]

Westreich

[11] Patent Number: 4,650,349
[45] Date of Patent: Mar. 17, 1987

[54] SPEED TYPING APPARATUS AND METHOD

[75] Inventor: Andrew J. Westreich, Minneapolis, Minn.

[73] Assignee: CPT Corporation, Eden Prairie, Minn.

[21] Appl. No.: 581,135

[22] Filed: Feb. 17, 1984

[51] Int. Cl.$^4$ .............................................. B41J 7/90
[52] U.S. Cl. ...................................... 400/98; 364/900
[58] Field of Search ... 364/200 MS File, 900 MS File; 400/95, 98–100, 485

[56] References Cited

U.S. PATENT DOCUMENTS 4,464,070  8/1984  Hanft et al. ........................... 400/98

FOREIGN PATENT DOCUMENTS 33782  4/1981  Japan ..................................... 400/98

OTHER PUBLICATIONS

*IBM Tech. Disc. Bulletin*, by G. W. Doyle et al, vol. 23, No. 2, Jul. 1980, pp. 683, 400–498.

Primary Examiner—Paul T. Sewell
Attorney, Agent, or Firm—Merchant, Gould, Smith, Edell, Welter & Schmidt

[57] ABSTRACT

A speed typing method and apparatus for use in association with a word processor (5) are disclosed. An encoded Key (40) of alphanumeric characters and its associated Replacement Text (41) are pre-stored (50–67) in Memory (12). Operator entries to the processor are divided into segments of character entries bordered at their opposite ends by "space" or "carriage return" entries. Each segment is compared (70–97) with the pre-stored Key entries, and whenever identity is found (98), that segment of characters is replaced by the pre-stored Replacement Text associated with the identified Key (99–101). The initiation of the comparison process requires no special function Keys or steps to be performed.

2 Claims, 9 Drawing Figures

Fig. 5A
MEMORY LOADING PROCESS

SPEED TYPING APPARATUS AND METHOD

TECHNICAL FIELD

This invention generally relates to electronically assisted data entry apparatus, and more particularly to an apparatus and method for increasing the typing speed attainable on electronic word processing apparatus.

BACKGROUND OF THE INVENTION

The are many typewriter or keyboard devices available today which are electronically assisted by computers or microprocessors for storing, manipulating and displaying the operator entered information. Historically, the term computer has been used to denote such devices used primarily for the manipulation of entered numbers or data, and the term word processor has been used to refer to such apparatus whose primary function is to manipulate and display entered letter or word information. With the advent of personal and home computers and microcomputers, the distinction has become less noticeable, and the same equipment is often used to perform both data and word processing/handling operations. As will become apparent from a more detailed description of the invention, the present invention applies equally well to "data" and "word" processing apparatus; however, for the purposes of simplifying the description herein, the present invention will be described with respect to its applicability to apparatus typically referred to as word processing apparatus.

Word processing and data processing apparatus generally includes Input/Output apparatus (generally referred to as peripheral I/O devices), a Central Processing Unit (generally referred to as a CPU) and Memory. In general the CPU or processor performs the central control functions for the system and communicates or interfaces with the peripheral I/O devices and with Memory. The Memory generally stores instructions, information and data. The peripheral I/O devices pass information to and receive information from the CPU and Memory under control of the CPU. In a word processor apparatus, the peripheral I/O devices generally include an input keyboard, a television-like visual display unit, a printer and auxiliary text storage media such as floppy disks or diskettes or magnetic tapes.

An operator enters original information or text directly into the system by means of the input keyboard, or enters prerecorded information or text into the system from auxiliary text storage media forming a part of the peripheral I/O devices. The visual display enables the operator or typist to view the entered information and to view the effects of manipulation of such information before it is printed in hard copy by the printer, or stored for future use in the auxiliary text storage media. Word processor visual displays vary from single line displays to full page displays, and employ such elements as cathode ray tubes, liquid crystal or gas plasma displays and the like. The combination of the keyboard and visual display is generally referred to as a Work Station.

As stated above, the word processor includes Memory which includes an internal memory unit directly associated with the CPU which contains operating instructions and where the entered text is actively stored and manipulated. The space available in such internal memory for storing text is typically not very large, and in many word processors, the internal memory can hold only one or two pages of text. Therefore, most word processor systems use remote memory devices such as magnetic tapes, floppy disks (diskettes) or hard disks in the peripheral I/O devices for storing additional pages of text. Floppy disk-type auxiliary memory devices can typically store between 80 to 100 pages of text.

Obviously, the analytical nature of the word processor apparatus provides the operator with a powerful tool to rapidly enter, manipulate and print information and to store such entered information for subsequent reuse and further subsequent manipulation. Not only can the word processor be used to reprint entered information, as was the case with electronic typewriters, but the information can be rearranged and edited at will by the operator. However, the operational speed of a word processor is typically limited by the operator or typist providing input to the processor, since the text-processing capabilities of the typical word processor greatly exceed the typing (i.e. keyboard entry) capabilities of the average operator. Therefore, unless operatively time-shared by a number of Work Stations, the operational capability of the typical word processor CPU is rarely taxed. Recognizing this fact, techniques have been developed in the art to utilize the otherwise idle time of the CPU by performing additional tasks not possible with prior art electronic typewriter apparatus. One such task has been to detect and correct spelling errors in the operator entered text.

Little has been done, however, to increase the speed at which an operator can actually enter data or information into the word processor. For example, it would be desirable for an operator to simply enter short-hand versions of often used words or phrases, during the normal course of his typing entry, and have the CPU automatically display the long-hand representations of the short-hand entries. While others have looked at this issue, all such attempted solutions of which the inventor is aware have required the operator to activate special purpose "function" keys not forming an integral part by the standard typewriter keyboard in order to actuate the comparison function. Further, such prior art systems that have dealt with the comparison and replacement of encoded entered information with lists of long-hand replacement text have either used excessive memory of the system or have used techniques for comparing the encoded information against the library of replacement text that were too slow to be practically implemented.

The present invention addresses the shortcomings of prior art methods and apparatus for increasing the speed at which information and data can be entered into a word processor. The method and apparatus of the present invention allow the operator to reduce the number of keystrokes required to rapidly enter text into the processor. The method and apparatus of this invention are totally interactive features that allow the operator to access the long-hand version of any code from a library of such entries without touching any special purpose "function" keys that are foreign to the standard typewriter keyboard. With the present invention, whenever the operator types a pre-stored short-hand encoded designation, using the standard typewriter keyboard entry keys, the long-hand representation of such designation automatically appears and replaces the encoded designation on the visual display and in subsequent hard copy print-out. The text replacement takes place in real time as the operator continues to key information into the word processor, and without interruption of his normal "typing" flow or rhythm on the standard keyboard. Complex words, names or phrases can be quickly and consistently entered in the natural flow of typing. In addition, the present invention can be used to automatically correct common typing errors.

SUMMARY OF THE INVENTION

The method and apparatus of the present invention provide a completely automated technique for replacing encoded operator entries, made during the operator's normal course of typing information into a word processor, with replacement text. The invention includes both a process and the means for implementing the process in a word processor having a memory, a central processor unit and a keyboard, a portion of which comprises the standard typewriter keyboard. According to one embodiment of the invention, one or a plurality of encoded "Key" entries are stored in the processor memory. The Key entries are simply strings of one or more alphanumeric characters that represent the text (i.e. "Replacement Text") that will be used to replace the Key later on in the process. As used herein, the term alphanumeric refers to any letter, number punctuation, character or symbol that may be typically represented on the standard typewriter keyboard. While the encoded key entry is generally much shorter (i.e. a short-hand version) than the Replacement Text, it need not be shorter, and could be of the same length or even of shorter length than the Replacement Text. Replacement Text entries, one each identifiably being associated with each of the unique Key entries, are also stored in memory. In a preferred embodiment of the invention, the Key and its associated Replacement Text are stored in the same memory lexicon and adjacent to one another, and a plurality of such Key/Replacement Text entries which form a list or dictionary of such entries are serially stored within the same memory lexicon. As stated above, the Replacement Text comprises one or more alphanumeric characters and may comprise several words or an entire phrase.

As the operator makes entries into the word processor by means of the standard typewriter keyboard thereof, all such entries are monitored and compared with the pre-stored Key entries. The comparison process occurs automatically, without any separate initiation functions being required by the operator, such as his activation of special function keyboard pads to begin the comparison process. According to a preferred embodiment of the invention, the operator entries typed into the processor keyboard are examined in the same order in which they are entered. The operator entries are examined in segments of characters, with each segment of characters being bounded on either end by a "Space" or "Carriage Return" entry. Therefore, each time the operator enters a "Space" or "Carriage Return" on the keyboard, a segment of operator entered information is defined, and that segment is immediately compared against the pre-stored list of Key entries. If the examined segment identically compares with one of the pre-stored Key entries, the characters of the operator entry segment are immediately replaced by that pre-stored Replacement Text that is identifiably associated with that particular Key.

A preferred embodiment of the invention uses a two-tiered Key comparison technique. The encoded Key information is stored with its associated Replacement Text in one memory lexicon, and is also processed by hash-coding techniques and stored as a hash code string in a second memory lexicon. Using the two-tiered comparison method, an operator entered segment of information is converted into a hash code string, using the same technique that was employed to generate the hash coded Key strings, and is first compared to the hash coded Key representations in the second memory lexicon. If a favorable comparison is made, indicating that there is a high probability of an identical Key entry appearing in the first memory which corresponds to the segment being analyzed, then the segment is actually compared character-by-character against the Key entries in the first memory lexicon. Therefore, by use of this invention, properly encoded entries made by an operator in the course of his normal typing operations on the standard keyboard portion of the word processor, are automatically replaced, in real time, by pre-stored Replacement Text, thereby eliminating keystrokes and significantly increasing the operator's typing speed.

While the invention will be described with respect to its use in a particular word processor, it will be understood that other data processing equipment could equally well be used. In particular, while a system using multiple processors will be described, it will be understood that much simpler systems, for example, those employing a single central processing unit could equally well be used. Further, while a two-tiered Key entry and comparison system will be described, it will be understood that the principles of this invention apply equally well to a process and apparatus which uses only a single Key entry and comparison technique. Further, while in the two-tiered comparison technique described, hash-coding principles have been used for the preliminary Key screening/comparison technique, other techniques not using hash-coding principles could be employed. Further, while the preferred embodiment discloses storage of the Key and its Replacement Text together in the same memory lexicon, the Key and its associated Replacement Text need not be stored together or even in the same lexicon. Further, while the preferred embodiment of the invention will be described as applicable for use with an ASCII encoding format, that the invention applies as well to other encoding formats. These and other variations of the invention will become apparent to those skilled in the art in light of the following description of the invention.

BRIEF DESCRIPTION OF THE DRAWINGS

Referring to the Drawing wherein like numerals represent like parts throughout the several views.

DESCRIPTION OF THE INVENTION

Figure 1:
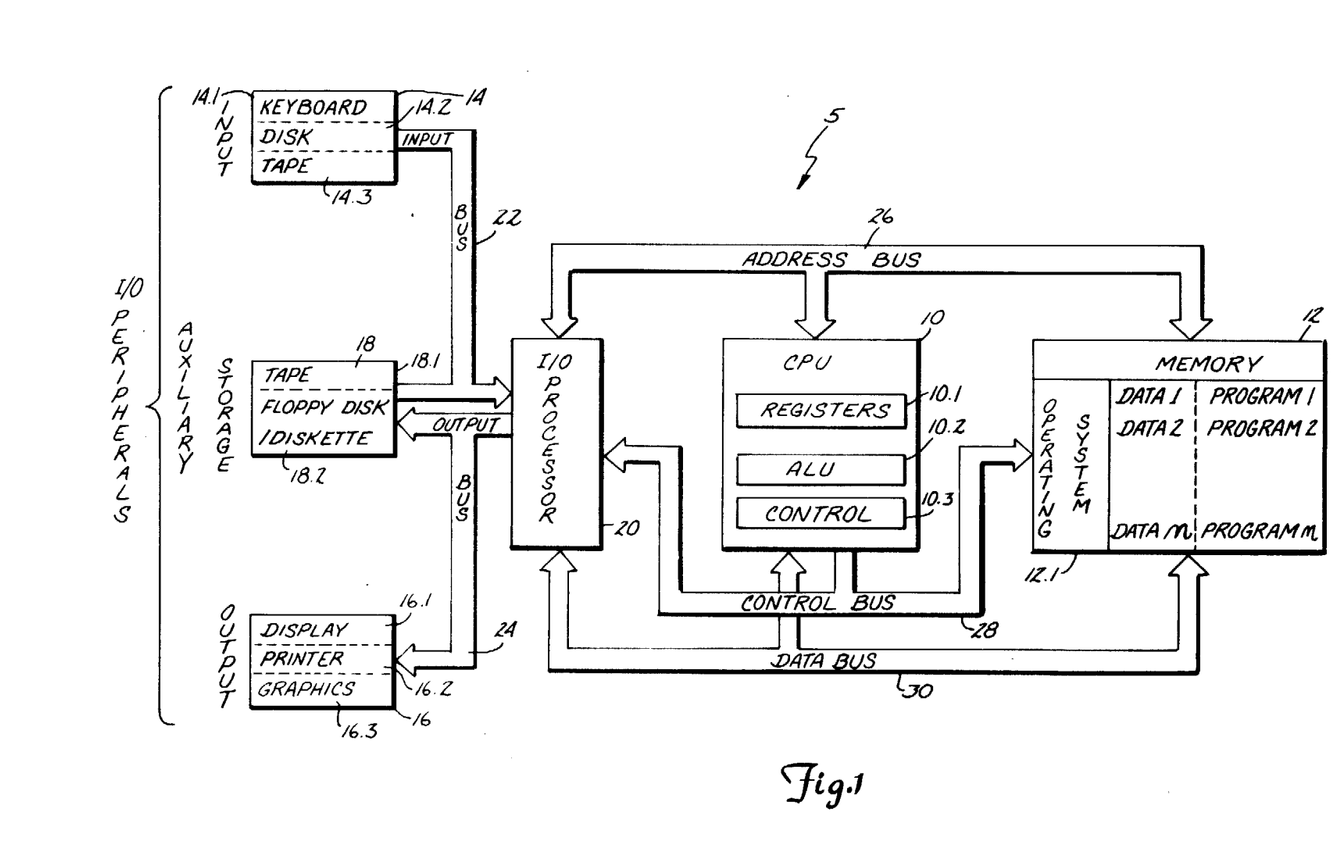
FIG. 1 is a diagrammatic block diagram of a typical data/word processing system with which the present invention can be used.

Referring to the drawings, there is generally illustrated in FIG. 1 a block diagram representation of a typically word processing system 5 with which the present invention can be employed. Since the details of such processing systems are well-known to those skilled in the art, only the basic interrelation of the primary components of the processing system will be briefly described herein, it being understood that those skilled in the art can apply the general functional principles to the desired variation of digital processing system with which the invention will be used. Referring to FIG. 1, the word processing system illustrated is of the type which uses an I/O processor or peripheral processor for communicating with the I/O Peripheral devices, as hereinafter described in more detail.

As is well-known in the art, the heart of the word processor is the Central Processing Unit (i.e. CPU), generally designated at 10. The CPU is the nerve center of the system and is responsible for executing instructions and for the overall control of operations in the system. While only one CPU is illustrated in FIG. 1, it will be understood that systems having multi-processing capabilities would have additional CPU units. As is well-known to those skilled in the art, the CPU 10 generally includes "Registers" (generally designated at 10.1) which are used for holding temporary results and data for CPU operations. Such Registers include, for example, the Program Counter (not specifically illustrated) which keeps track of the location of the next instruction in Memory. Others of the Registers 10.1 keep track of the status of operations of the CPU as it executes a program. The CPU also includes "Arithmetic and Logic Unit" (ALU) circuits (generally designated at 10.2) which perform the computational, logical and operational decision function of the processor. The CPU further includes "Control" circuits (generally designated at 10.3) which insure that the various signals or communication needs with other components of the system are provided so that instructions are properly performed.

A Memory 12 stores programs, data and operands. Such instructions and data are stored in the form of digital codes in a step-by-step sequence. The Memory 12 is typically organized in square form, having an equal number of rows and columns, with each intersection of a row and column comprising a memory cell that may be one or more bits. Since the two most common digital codes for representing alphanumeric characters (ASCII and EBCDIC) are easily maintained in 8 bits, most word processor Memories are structured so that the smallest addressable cell consists of 8 bits, referred to as a byte. The memory cells are often specified in terms of words which may consist of one or several bytes. Typically the word size relates to the CPU and is usually the size of the ALU 10.2 registers in bits; however, addressable cell units can be less than this word size. The memory may be subdivided into a number of separately addressable memory blocks or banks. A uniquely identifiable block of memory is sometimes referred to as a Lexicon. As illustrated in FIG. 1, the Memory 12 may contain a number of programs, generally designated as "program 1" through "program n", each having associated therewith a block or bank of memory reserved for associated data, designated respectively as "data 1" through "data n". The Memory 12 is also illustrated as including an "operating system" 12.1 generally comprising a set of programs that monitor and control the execution of the various user programs "1" through "n".

Input to and output from the CPU 10 and Memory 12 portions of the processor 5 are provided by a plurality of I/O Peripheral devices. The Input devices (generally designated at 14 in FIG. 1) provide input information to the processor. Such information may be in the form of programs, program related information, or data. The Input units 14 may comprise a plurality of physical devices such as a keyboard 14.1, a floppy disk drive 14.2 (for reading and writing information from or on floppy disks or diskettes), a magnetic tape 14.3, or the like. The Output units (generally designated at 16 in FIG. 1) record and display information from the processor so that it can be used by the operator. Such Output units 16 typically comprise a visual display unit 16.1 (such as a cathode ray tube display), printers 16.2, graphics recorders 16.3, and the like. Information can be transmitted to and from the processor 5 by means of Auxiliary Storage units (generally designated at 18 in FIG. 1). Such Auxiliary Storage units may comprise magnetic tape units 18.1, floppy disk or diskettes 18.2, or the like. In the diagram illustrated in FIG. 1, communication between the I/O Peripheral devices and the Memory 12 is controlled by an I/O Processor Interface network 20. The I/O Processor 20 generally controls the transfer of data between the respective I/O Peripheral devices and the Memory 12, and provides a direct channel for the flow of data between the respective I/O device and Memory without typing up the CPU 10 for such information transfer. The I/O Processor 20 is directly controlled by the CPU 10.

Communication between the functional blocks of the system is performed by various bus lines. Input information is provided to the I/O processor 20 from the Peripheral Input devices 14 and the Auxiliary Storage devices 18 by means of an Input Bus 22. Information from the I/O Processor 20 is carried to the Auxiliary Storage devices 18 and to the Peripheral Output devices 16 by means of an Output Bus 24. The CPU 10 sends address instructions to the I/O processor 20 and to the Memory 12 by means of an Address Bus 26. Since each Peripheral I/O unit of the system has an address, and since each information location in Memory has an address, the CPU locates specific information in Memory or controls activation of the respective Peripheral I/O devices by address instructions sent by means of the Address Bus 26. At the same time, other digital codes representing control signals are sent from the CPU 10 to the I/O Processor 20 and to the Memory 12 by means of a Control Bus 28. Control signals sent by means of the Control Bus 28 tell the memory what to do (i.e. either to read or write information into or from the memory location designated by the address on the Address Bus). The information coming to the CPU 10 from the Memory 12 when a memory is read, or going to the memory from the CPU to be written into memory, is also in digital code and travels along the Data Bus 30. The Data Bus 30 also carries data information between the Peripheral I/O devices 14, 16 and 18 and the Memory 12, through the I/O processor 20.

The above simplified description of a word processor will be readily understood by those skilled in the art.

More detailed description of the details of computer operation can be found in numerous publications such as *Understanding Computer Science* by Roger S. Walker, published by Texas Instruments Information Publishing Center. The above general description of a word processing system is applicable to most word and data processing systems on the market today. It will be understood by those skilled in the art that the described system could be simplified by elimination of the I/O Processor 20, and that other variations of the apparatus can be implemented to accommodate the particular application to which the processor is to be put.

Figure 2:
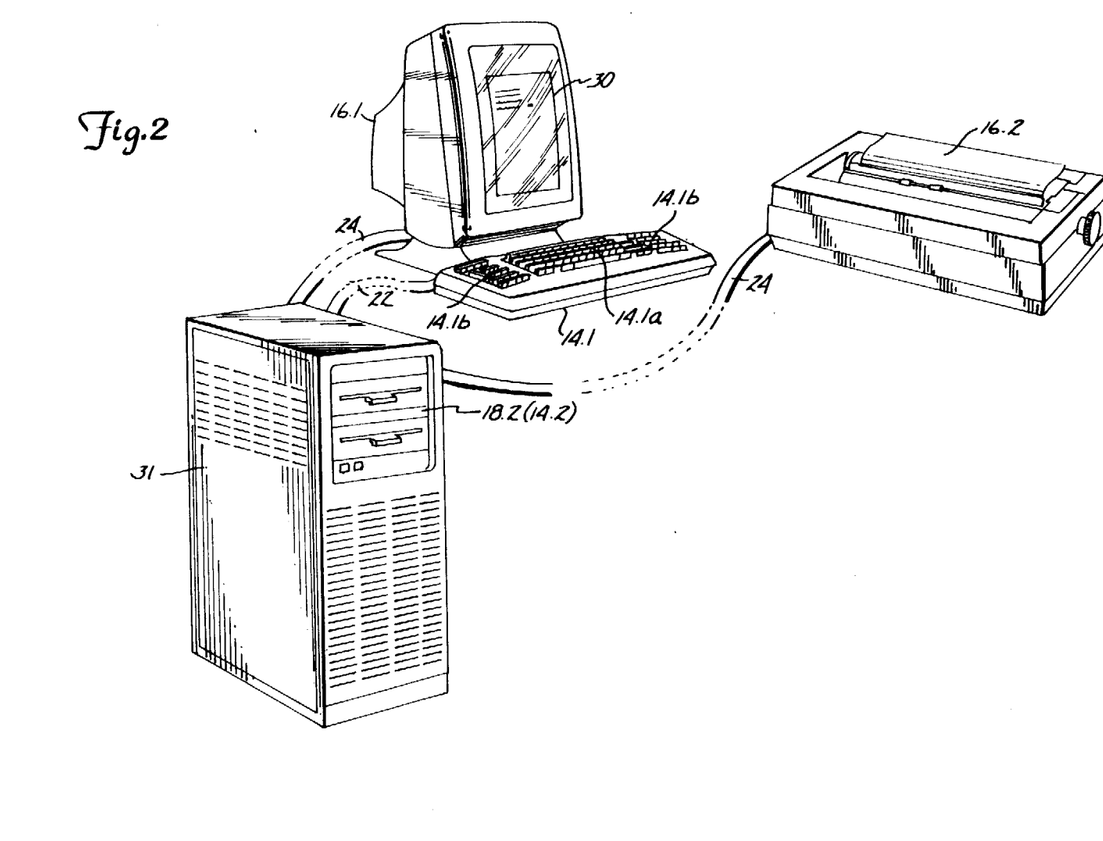
FIG. 2 is a pictorial diagram of an illustrative word processing system embodying the functional processing blocks illustrated in FIG. 1.

One processing system with which the present invention can be readily used is the word processing system manufactured and sold by CPT Corporation under the CPT PHOENIX TM trademark. The CPT PHOENIX TM system is actually more than a simple word processing system and more accurately should be referred to an "information processor". It will be understood that while a particular configuration of a processing system is being disclosed with respect to a description of the preferred embodiment of the invention, that other processing systems could equally well be used within the scope of this invention. A pictorial view of the CPT PHOENIX TM information processing system is illustrated in FIG. 2. Referring thereto, the Work Station of the system generally includes a visual Display Monitor 16.1 and a Keyboard 14.1. The Display Monitor 16.1 has a cathode ray tube visual display surface upon which information entered into the system can be visually displayed. One "page" of such information is diagrammatically illustrated in at 30 FIG. 2. The Keyboard 14.1 generally includes a central section of keys (14.1a) comprising the standard typewriter keyboard, and two groups (14.1b) of special purpose keys for implementing various functions and programs on the system.

In the preferred CPT PHOENIX TM information processing system used, the CPU 10, Memory 12, I/O Processor 20 and related Address, Control and Data Buses (26, 28 and 30) respectively as well as the Auxiliary Storage floppy disk units 18.2 (all as previously described with respect to FIG. 1) are housed within a free-standing Microframe unit generally designated at 31. The Auxiliary Storage portion of the Microframe 31 includes a pair of Disk Drive units, generally designated at 18.2. In the preferred embodiment illustrated, the Disk Drive units 18.2 comprise two double-sided dual-density 8-inch floppy disk drives with the ability to read/write single-sided, single-density diskettes. A Printer, generally designated at 16.2 is illustrated, for providing printed copies of information from the system. For conformity with the functional diagram of FIG. 1, communication between the Microframe module 31, the Display Monitor 16.1 and the Printer 16.2 is provided by means of the Output Bus 24; and communication between the Microframe module 31 and the Keyboard 14.1 is provided by means of the Input Bus 22. It will be understood that in the system illustrated, the Disk Drive units 18.2 (14.2) provide both the Auxiliary Storage and the Peripheral Input functions of the devices of like number in FIG. 1.

In the CPT PHOENIX TM system described, the Microframe 31 includes a plurality of processors, including: an 8085 8-bit word and data processing processor; an 8086 16-bit data processor; 8088 and 8089 16-bit I/O processors; and an 8041 8-bit processor for controlling tone generation and communications between the keyboard and a graphics controller (if used). Also, in the illustrated system, the keyboard 14.1 itself includes an 8040 8-bit processor for decoding keystrokes for serial transmission to the graphics controller processor in the Microframe 31. As previously mentioned, while the system of the preferred embodiment uses a plurality of processors, it will be understood by those skilled in the art that the invention applies equally well to a processing system employing only a single processor unit.

In most word processors and as used in the preferred embodiment of this invention the input, output and storage functions are performed with use of the American Standard Code For Information Interchange, commonly referred to as the ASCII Code. This code is a standard code for information exchange as specified by the USA Standards Institute, and is sometimes also referred to as the USASCII Code. Use of the code is well-known in the art. For example, reference can be had to a text entitled "Reference Data for Radio Engineers" published by Howard W. Sams & Co. (1977) pages 35–45 and 40–25. When processing information in the word processor, each letter, number and character (including the "Space" and "Carriage Return" entries of a typewriter keyboard) is assigned an ASCII code representation having corresponding Hexadecimal and a Decimal number equivalents. The Hexadecimal equivalents (i.e. base 16 representations) are readily translated to binary numbers that can be directly processed by the digital circuitry of the processor. While the entire ASCII code table of representations will not be reproduced herein, by way of example only, the letters "A", "B", "C" and "Z" have equivalent Decimal ASCII code representations of "65", "66", "67" and "90" respectively, and equivalent Hexadecimal ASCII code representations of "41", "42", "43" and "5A" respectively. As is well-known in the art, the benefit of using Hexadecimal representations in the digital art is that each Hexadecimal representation can be rapidly translated to a corresponding 8 bit binary value. For example, ASCII binary equivalent of the letter "A" is 0100 0001, of the letter "B" is 0100 0010, of the letter "Z" is 0101 1010, and so on.

The processor apparatus of this invention is programmed as hereinafter described in more detail, to automatically compare all keyboard entries by an operator which immediately precede a "Space" or "Carriage Return" entry against a table of encoded "Key" entries that have previously been entered into Memory of the system. If a one-for-one comparison of an operator entry with a prestored Key entry is established, the corresponding entry just typed by the operator on the keyboard will be replaced by pre-stored "Replacement Text". The replacement takes place automatically in real time and under control of the processor, as the operator continues making entries via the keyboard into the processor, without requiring any additional input by the operator and without requiring the operator's fingers to leave the standard typewriter keyboard keys to accomplish the replacement function.

An understanding of the present invention may be simplified by reference to an example that applies the method and apparatus of this invention to a practical situation. The invention functions to save the operator unnecessary keystrokes on the typewriter input keyboard when entering repetitive information, words or the like into the processor. For example, if the operator were typing a lengthy report in which the word "communication" was repetitively used, use of this invention would enable the operator to reduce the keystrokes required to enter the word "communication" from 13 keystrokes to 2 even to 1 keystroke per entry by enabling the operator to simply type or enter a predetermined short-hand code or Key for the word "communication". Since the particular code used by the operator can be personalized to that operator for his personal use in forming entries into the processor, he can generate a personal list or dictionary of encoded Key entries for those words he may wish to enter on the keyboard in short-hand manner and can style the encoded Key entries from keyboard letters or characters with which he is comfortable. For example, the operator could select any encoded combination of letters such as "cm", "com", "cmm" or the like as his Key representation of the word "communication". Once the operator's selected Key is properly entered into the system Memory, as hereinafter described, whenever the designation or Key such as "cm" is entered on the keyboard and thereafter followed by either a "Space" or a "Carriage Return", the apparatus and method of this invention identifies such entry as corresponding to a pre-stored Key and automatically replaces the short-hand designation Key "cm" with the "Replacement Text" "communication". Therefore, the operator has, in this example, saved 11 keystroke entries for typing "communication", thereby significantly increasing his typing speed.

The "Replacement Text" need not be limited to a single word, as in the above example, but could represent entire phrases, slogans or the like. For example, the Key "st" could have a corresponding Replacement Text of "Dr. Sandra Taler". In the preferred embodiment, the length of Replacement Text is limited to a single "line" of text characters; however, the principles of this invention could be applied to Replacement Text representations including several lines of text. Further, the "Replacement Text" need not necessarily contain more characters than the Key. For example, in situations wherein the invention operates as an automatic spelling corrector for correcting commonly misspelled words, the Key entry may correspond to an incorrect spelling of a commonly misspelled word such as "hte", where the Replacement Text would comprise the correct spelling (i.e. "the"). In some situations, for example where consistency throughout a document is required, it may even be desirable to have the length of the Key exceed that of the Replacement Text. Numerous variations and adaptations of the invention will become apparent to those skilled in the art in view of the following description.

It will be understood that the format of the encoded Key entries and the manner in which the Key and Replacement Text entries are stored in memory can vary. However, in the preferred embodiment of his invention, the inventor has found a dual Key storage technique to be particularly useful. Such dual Key storage technique includes storage of the encoded Key entries in two distinctly separate bounded portions or Lexicons of the Memory 12 as diagrammatically illustrated in FIG. 3. The Key entries are stored in "hash code" string format (hereinafter described in more detail) in a first Lexicon of Memory 12 (generally designated at 12A in FIG. 3) termed the "Hash Code Lexicon". The Key entries are also entered in ASCII format, along with their corresponding Replacement Text, in a second Lexicon of Memory 12 (generally designated at 12B in FIG. 3), termed the "Entry Table Lexicon".

Figure 4:
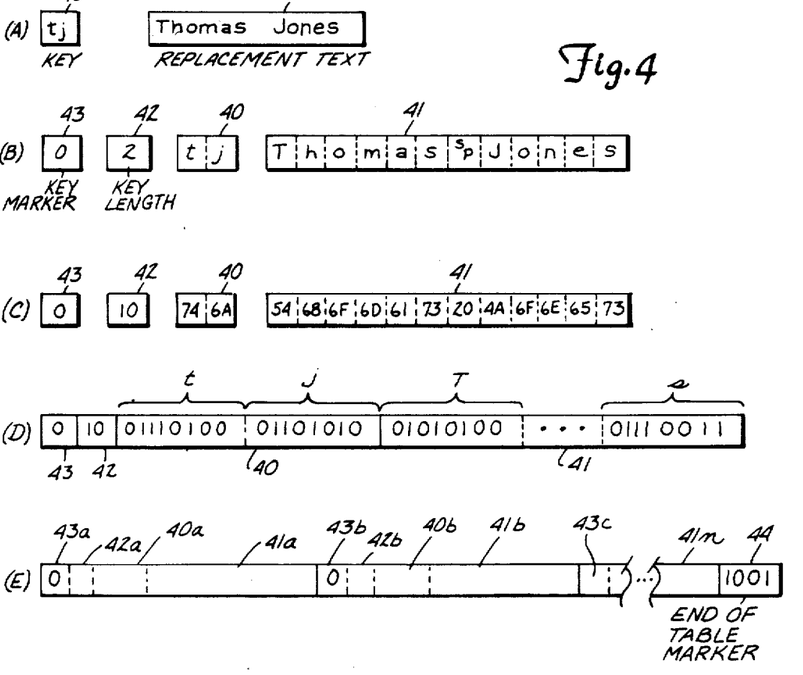
FIGS. 4(A)–4(E) are a series of diagrammatic representations illustrating how the Key and Replacement Text entries are formatted for entry into the Entry Table Lexicon of FIG. 3.

Description of the format for entry of the Key and Replacement Text entries into the Entry Table Lexicon 12B follows, with corresponding reference to FIG. 4. All of the Key and Replacement Text entries of a library, list or dictionary of terms to be stored, are serially stored within the Entry Table Lexicon 12B, according to the format illustrated in FIG. 4. FIG. 4 illustrates the format for a Key "tj" and its Replacement Text "Thomas Jones". FIG. 4A illustrates the simple alphanumeric character representation of the Key "tj" (generally designated at 40) and its Replacement Text representation "Thomas Jones" (generally designated at 41). FIG. 4B illustrates a preferred format used to store the Key 40 and Replacement Text 41 entries in the Entry Table Lexicon 12B. The representations illustrated in FIG. 4B are in alphanumeric characters. Referring thereto, the Key 40 is illustrated as a 2 character representation comprising the letters "t" and "j"; and its associated Replacement Text 41 is illustrated as a 12 character representation comprising the individual letters spelling "Thomas" and "Jones" separated by a "space" character(SP). The Key 40 is immediately preceded by a "Key Length" designation 42 comprising the number of alphanumeric characters contained within the Key 40 (e.g. in this example, "2"). The Key Length 42 is immediately preceded by a "Key Marker" designation 43, which is selected in the preferred embodiment, to be a binary "zero". The Key Marker 43 indicates the beginning of a Key/Replacement Text entry.

Figure 3:
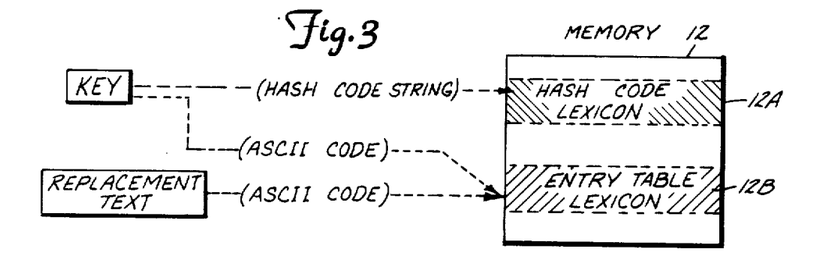
FIG. 3 is a diagrammatic illustration of how the Key and Replacement Text information of the present invention is entered into Memory Lexicons.

As indicated in FIG. 3, the Key and Replacement Text entries into the Entry Table Lexicon 12B are in ASCII code format. Such ASCII code format for the FIG. 4B representation is illustrated in FIG. 4C. Referring thereto, the Key Marker 43 designation remains the same as in FIG. 4B, (i.e. a binary "zero"). The Key Length 42 designation is directly converted into a binary "10" representation for the Decimal number 2. The Hexadecimal ASCII code representation of the Key 40 letters "t" and "j" are respectively "74" and "6A". Similarly, the respective Hexadecimal ASCII representations of the Replacement Text 41 letters are illustrated, wherein the "Space" between the "Thomas" and "Jones" words of the Replacement Text 41 is represented in Hexadecimal notation as "20". Finally, the entire entry is converted to a binary representation suitable for entry into the Memory 12 as indicated in FIG. 4D. Referring thereto, the previously designated portions of the entry have been placed adjacent to one another (i.e. with no spaces between them) as they would actually appear as entered into the Entry Table Lexicon 12B. As illustrated in FIG. 4D, the binary representations of the Key 40 and Replacement Text 41 characters, each comprise an 8 bit binary number, with the least significant bit being positioned at the "right" of the number.

In the preferred embodiment, each encoded Key 40 and its Replacement Text 41 is serially entered into the Entry Table Lexicon 12B in the binary format as illustrated in FIG. 4D, with successive entries being separated by the binary "zero" Key Marker 43. The last Replacement Text 41n entry made into the Entry Table Lexicon 12B is followed by and "End of Table Marker" 44 which is selected in the preferred embodiment to be a binary "9" (i.e. "1001"). This serial entry technique is diagrammatically illustrated in FIG. 4E, wherein entry segments for the first entry are denoted by the reference character "a", for the second entry are denoted by the reference character "b" and for the "nth" entry, by the reference character "n".

As previously discussed, the Key portion of an entry is also stored within the Hash Code Lexicon 12A of the Memory 12. As is well-known to those skilled in the art, "hash coding" is a term referred to a statistical or probabilistic technique for testing set membership and is a simple abstraction of looking a word up in a dictionary. The technique is described in numerous references, as for example in the Note entitled "Experience with a Space Efficient Way to Store a Dictionary" by Robert Nix published in the "Computing Practices" section of *Communications of the ACM*, May 1981, Volume 24, No. 5, pages 297 and 298.

As is known to those skilled in the art, the term "hash coding" is basically a technique or process of looking at numbers (or in this case letters to which number values are assigned) in a plurality of different ways. Obviously many different types of hash coding operations (sometimes referred to as hashing functions) can be performed on a string of numbers. By selecting hashing functions which give significantly different results when performed on the same string of numbers, and by selecting an adequate number of such hashing functions for acting on the number string, the probabalistic accuracy of the hash code identification technique can be made very high. For example, many different number strings, when acted on by one or even several of the hashing functions will produce the same results or answers. However, the probability of all the selected set of hashing functions acting on two different number strings producing the same results is extremely small. In the preferred embodiment, where the number of Key entries to be stored in the lexicon in hash-code format is relatively small (typically under 200), it has been found that use of 10 hashing functions provides a highly accurate system. However, it will be understood by those skilled in the art that the number of hashing functions used, the size of Memory used in the hashing functions themself can significantly vary and are matters of design choice.

Each Key entry to be stored within the Hash Code Lexicon 12A is represented by a hash code algorithm as a mapped word or number ranging from 1 to the total number of bits in the lexicon. For example, if the lexicon tables (T) includes 20,000 bits, the entries into the lexicon would be mapped or entered as number representations ranging between 1 to 20,000 bits. Any one of a number of hash code algorithms could be used for performing the mapping function. In general, such hash code algorithms include a number (n) of independent hashing functions or operations $h_1, h_2, \ldots h_n$ that would, in our example, map or represent the Key entries by numbers in the range of 1 to 20,000 bits. By way of example only: $h_1$ might be represented by the sum of the ASCII numerical representations of the Key characters; $h_2$ might be the product of the first Key character representation and a random number; $h_3$ might be the product of the second Key character representation and a random number; etc.

Using a hash code technique, the memory locations within the entire Hash Code Lexicon 12A are initially set to "zero". The Hash Code Lexicon 12A is accessed through the independent hashing functions $h_1$–$h_n$. Each Key in the list or dictionary of such Keys to be inserted into the Lexicon 12A table is inserted by setting bits T $[h_1(Key_1)]$, $T[h_2(Key_1)] \ldots, T[h_n(Key_1)]$ to a logical "one". A word or Key is looked up in the Lexicon 12A by testing $T[h_1(Key_1)]$, $T[h_2(Key_1)] \ldots, T[h_n(Key_1)]$. If any of these bits are "zero", then the Key or (Key$_1$) we are looking for is definitely not a part of the dictionary. If all of the bits of the testing function are set (i.e. logical "ones"), we say that the word or Key we are looking for is in the dictionary. The method has a disadvantage of occasionally verifying incorrect strings; however, the probability of this situation occurring is very low. One method of increasing the accuracy of the hash coded technique is to use a lexicon sized such that the total number of bytes within the lexicon approximates the total number of words or Key entries to be made into the entry.

The dual hash coding and ASCII Key entry technique (FIG. 3) provides a two-tiered system for determining whether a typed operator entry is the same as one of the Key entries previously stored in memory. The method and apparatus of this invention first converts each typed operator entry that is to be examined against the Key dictionary, into a hash code representation according to the same technique that was used to initially store the key entries of the dictionary into the Hash Code Lexicon 12A. By thereafter performing a comparison of the operator entry string (in hash coded form) with the prestored contents of the Hash Code Lexicon 12A, a rapid initial determination can be made as to whether further comparison of the typed entry against the Key entries in the Entry Table Lexicon 12B should be made. If the hash code comparison proves negative, further analysis of the typed entry is abandoned, and analysis of the next operator typed entry is pursued. If, on the other hand, the hash code comparison indicates a high probability of identity between the operator entry and a Key entry stored in the Hash Code Lexicon 12A, further comparison of the typed operator entry and the Keys 40 stored within the Entry Table Lexicon 12B is performed.

Figure 5A:
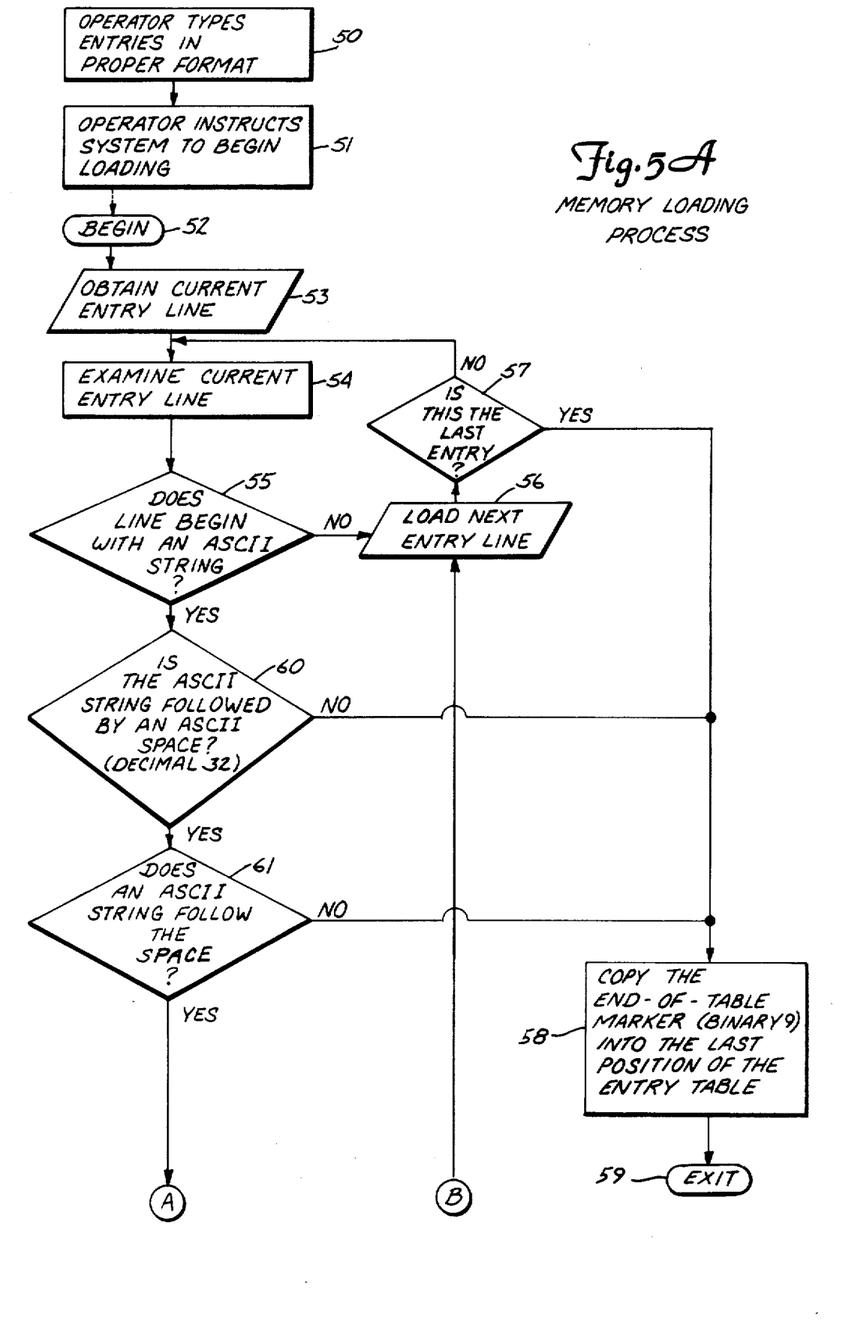
FIGS. 5A and 5B collectively represent a flow chart illustrating the process of loading Key and Replacement Text entries into the Memory as illustrated in FIG. 3.
Figure 5B:
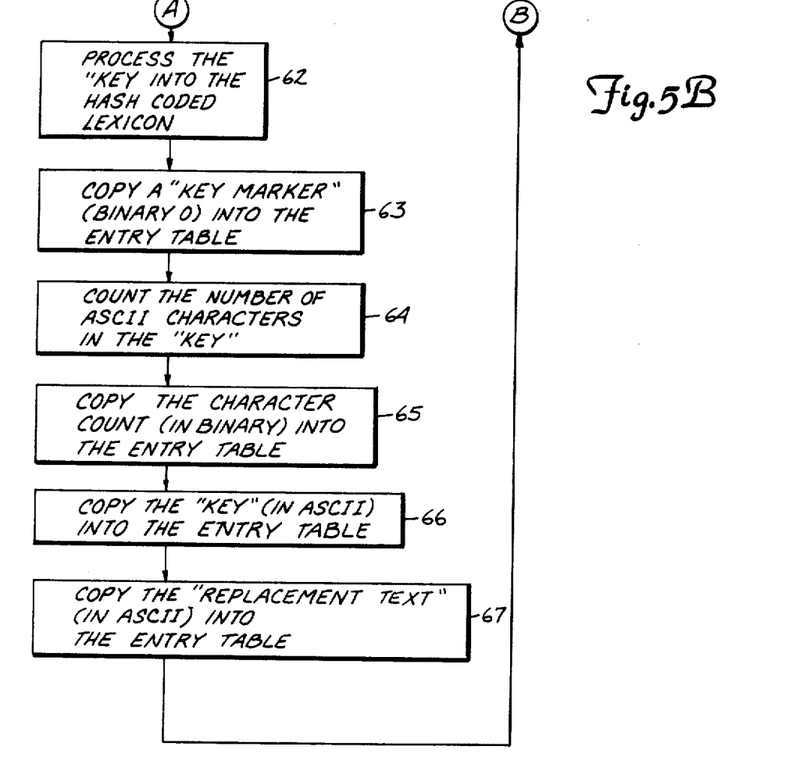

A flow chart for loading a list or dictionary of Key and Replacement Text entries into the Memory 12 according to the format previously described with respect to FIGS. 3 and 4, is illustrated in FIG. 5. The flow chart of FIG. 5 spans two drawing sheets, identified as FIGS. 5A and 5B. Referring thereto, as illustrated at Step 50, the operator types by means of the Keyboard 14.1 the list or dictionary of Key and Replacement Text entries that he wishes to load into the Memory 12. Such "list" of entries may be stored in the buffer memory of the system or could have already been prepared at an earlier date and be stored in Auxiliary Storage 18. He then (Step 51) instructs the system to begin loading, either from the buffer memory or from Auxiliary Storage; the list of Key and Replacement Text entries into Memory. At this point, the CPU 10 begins (Step 52) the loading process. In the loading process the typed operator entries are loaded and analyzed, one line at a time as indicated at Steps 53 and 54. If the loaded line does not begin with an ASCII string (Step 55), the next entry line is loaded (Step 56). This assumes that the line entry that was rejected in Step 55 was not the "last" entry available for loading (Step 57). If it was the "last" entry in the list to be entered into the Memory, the "End-of-Table Marker" 44 (see FIG. 4E) is copied into the last position of the table of entries made into the Entry Table Lexicon 12B (Step 58) and an Exit (Step 59) is made to the main editor.

If the entered line under examination in flow chart Step 55 begins with an ASCII string, further examination of the entry is pursued in Step 60 to determine whether the ASCII string is followed by an ASCII "Space". If no "Space" is present, an exit is made through Steps 58 and 59 as previously described. If the ASCII string (Step 60) is followed by an ASCII "Space", a determination is made (Step 61) as to whether an ASCII string follows the "Space". If not, an exit is made through Steps 58 and 59 as previously described. If a second ASCII string does in fact follow the "Space", the line entry is in proper format for entry into the Memory 12, and the loading process proceeds to Step 62. Referring thereto, the Key portion of the entry is processed into a hash code string according to the hash code technique previously described and is entered into the Hash Code Lexicon 12A. A Key Marker 43 (i.e. binary "zero") is then copied into the Entry Table Lexicon 12B (Step 63) and the number of ASCII characters in the Key being entered are counted (Step 64). The character count or Key Length 42 is then entered into the Entry Table Lexicon 12B (Step 65) and the Key is entered (in ASCII format as previously discussed with respect to FIG. 4) into the Entry Table Lexicon 12B, per Step 66. Finally, the Replacement Text 41 is copied into the Entry Table Lexicon 12B per Step 67 in the format previously described with respect to FIG. 4, and a return Step 56 is made for entry of the next line of information into the Key/Replacement Text list. When the last entry from the list has been stored in Memory by the described loading process, the "End-of-Table Marker" 44 (i.e. a binary "9") is entered into the last position of the entry table per Step 58, and an Exit 59 to the main editor is performed.

Figure 6A:
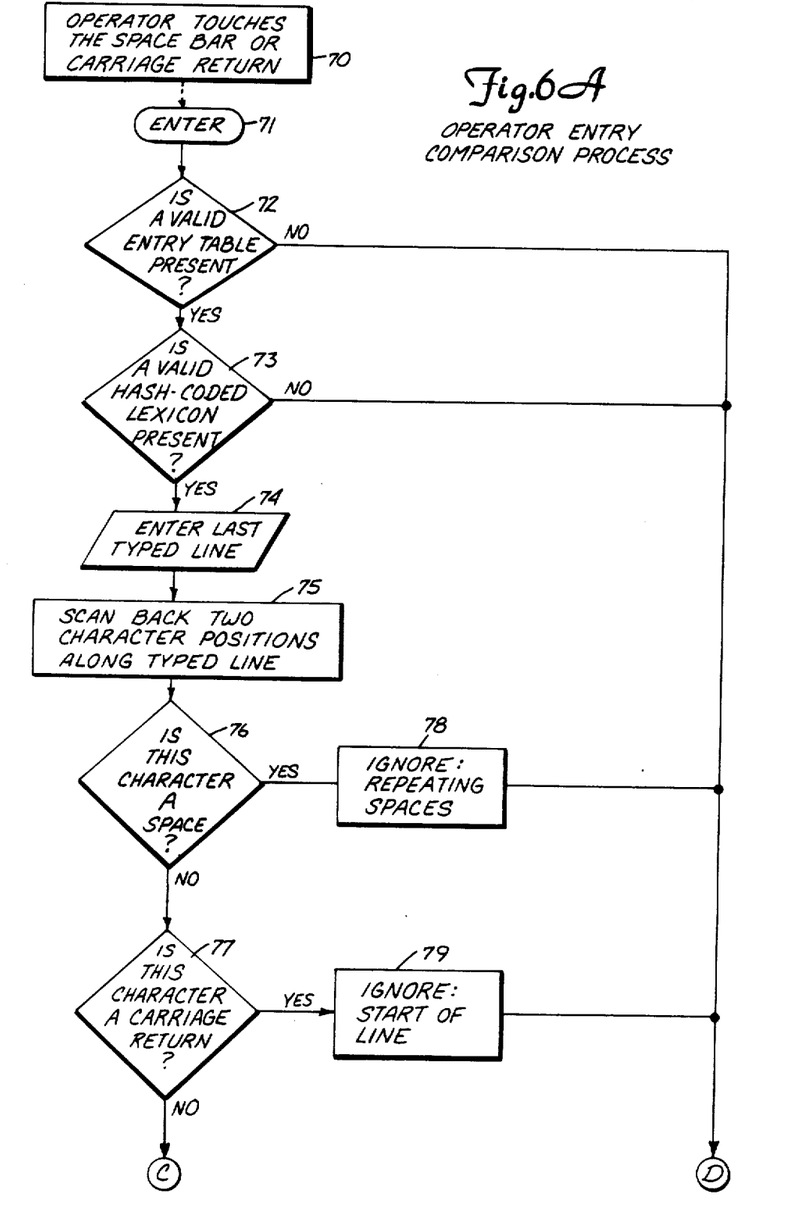
FIGS. 6A, 6B and 6C collectively represent a flow chart illustrating the process for comparing an operator-made processor entry against pre-stored Key entries and for replacing properly encoded entries with Replacement Text, according to the principles of this invention.
Figure 6B:
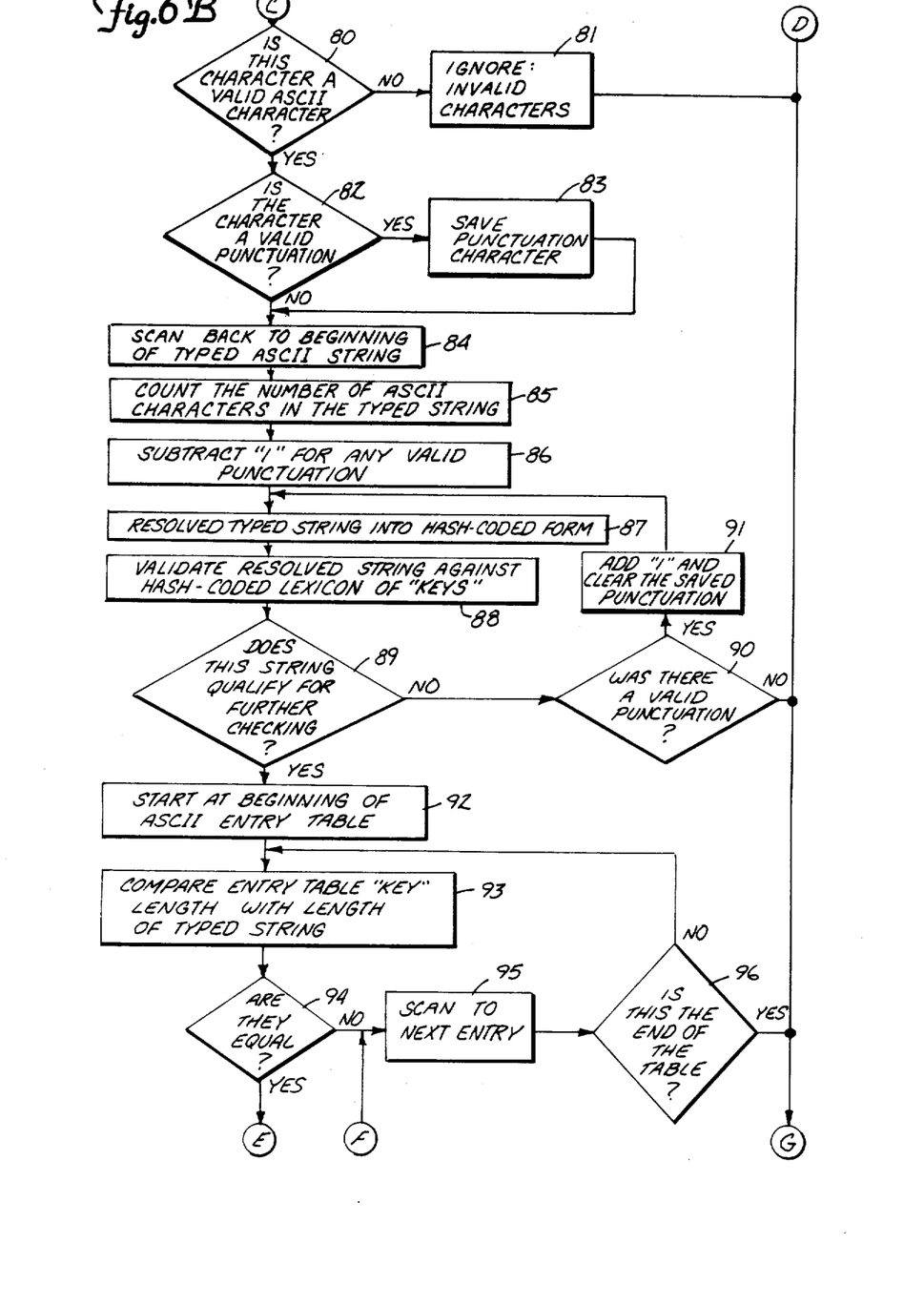
Figure 6C:
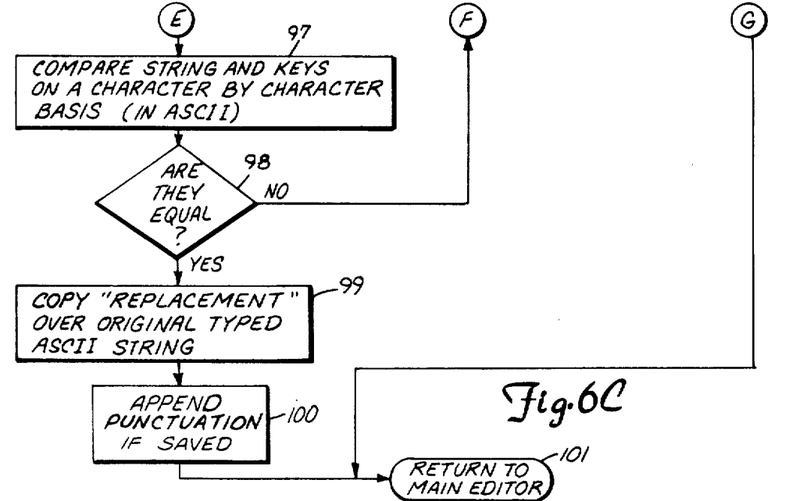

A flow chart outlining the primary steps in the process for comparing operator entries made during the normal keyboard typing activities of an operator with the pre-stored library of Key entries is set forth in FIG. 6. The flow chart of FIG. 6 spans three drawing sheets identified as FIGS. 6A, 6B and 6C.

Referring thereto, the operator typed entry/Key comparison process is automatically initiated each time the operator depresses the "Space Bar" or "Carriage Return" (see Step 70). In other words, initiation of the comparison function "automatically" takes place on each "segment" of information entered into the processor by the operator, without the operator ever having to remove his fingers from the standard typewriter keyboard keys (i.e. without requiring the operator to initiate the comparison operation by activating any "special purpose" function pads on the keyboard) and without requiring the operator to activate any of those pads on the standard typewriter keyboard in any manner other than that in which they would be actuated in the normal course of his rhythmic typing flow (e.g. he doesn't have to activate one or more keys successively, to begin the comparison process). The "segments" of typed information entered by the operator into the processor are defined as those characters appearing between successive "Space" or "Carriage Return" entries or any combination thereof, which are routinely made by an operator in the normal course of his typing entries (e.g. when placing "Spaces" between words, "Carriage Returns" between lines or paragraphs, and the like).

Referring to FIG. 6, the comparison procedure or process is entered at Step 71. The first decision 72 made in the process is to determine whether a valid Entry Table (i.e. a list of Key and Replacement Text entries as previously described with respect to FIG. 4) has been entered into the Entry Table Lexicon 12B. If a valid entry table is not present, the comparison process is discontinued and an Exit is initiated (Step 101). After establishing that a valid entry table has been entered into the Entry Table Lexicon 12B, decision Step 73 determines whether a valid hash-coded lexicon is present (i.e. whether a proper entry of hash coded string Key entries has been made into the Hash Code Lexicon 12A). If the Hash Code Lexicon 12A has not been properly loaded, exit from the comparison process is initiated by proceeding to Step 101. As has been previously discussed herein, the invention applies equally well to methods which do not use a two-tier Key comparison process. In such single-tiered comparison processes, it will be understood by those skilled in the art that references to the hash coding steps such as 73 would be omitted.

If the preliminary decisional Steps 72 and 73 indicate that a list or library of Key and Replacement Text entries have been properly stored in Memory, the comparison process of the operator entered information itself begins with Step 74. The last line typed by the operator into the system keyboard is entered and scanned so as to examine the next-to-the last character of the typed line (Step 75). If that character is a space (Step 76), indicating a repeating space, or if it is a carriage return (Step 77), indicating the start of a new line, comparison is not necessary and exit from the system respectively through Steps 78 and 79 and Step 101 is initiated. Similarly, if the next-to-the-last character is not a valid ASCII character (Step 80), comparison of the non-ASCII character against the stored Keys is unnecessary, since the characters of the Keys are only ASCII representations. If Step 80 detects an invalid (non-ASCII) character, an exit from the process through Step 81 and the Step 101 is initiated.

If Step 80 indicates the presence of a valid ASCII character, a determination is made in Step 82 as to whether such ASCII character under examination is a valid punctuation character (e.g. a period, semicolon, colon, question mark, or the like). This step provides for the situation wherein the encoded Key characters entered by the operator may be immediately followed by a punctuation mark, say for example, at the end of a sentence. In such case, it would be unnatural for and would interrupt the operator's rhythmic typing flow to insert a "space" between the Key and the punctuation mark. Step 82 (and subsequently described Steps 83, 86, 90, 91 and 100) recognize and accommodate this situation, and permit the operator to type the Key characters in the normal flow of the text. For example, with reference to the FIG. 4 example, if the operator types "tj.", the comparison process will recognize the "tj" as a valid Key entry just as though the "period" was not present. Further, the "period" is not lost from the copy, but is "saved" (Step 83) and is later reproduced at the end of the Replacement Text printout via Step 100. Therefore, in the FIG. 4 example an operator entry of "tj." would be finally printed out as "Thomas Jones." Returning to the flow chart, if a valid punctuation character is identified in Step 82, the punctuation character is saved (Step 83) and the comparison process proceeds to Step 84.

If the character being examined in the decisional Steps 76, 77 and 80 is a valid ASCII character, the comparison routine scans back to the beginning of the typed ASCII string (Step 84), counts the number of ASCII characters in that typed string (Step 85) and subtracts one count if the Step 82 determination was "yes", (thereby removing the punctuation mark from the encoded Key character count) (Step 86). The typed ASCII string is then resolved into hash-coded form (Step 87) and the hash-coded resolved typed string is resolved against the Hash Code Lexicon 12A of Keys (Step 88). Resolving the typed ASCII string into hash coded form is performed in exactly the same manner that was used in resolving the entered Keys into the hash coded form (e.g. Step 62 of FIG. 5). If the comparison (Step 89) of the hash coded string against the Hash Code Lexicon 12B reveals a positive comparison (i.e. a high likelihood of probability that there is a Key entry in the Hash Code Lexicon 12B that identically matches the hash-coded resolved string), the process continues by entering the Entry Table Lexicon 12B (Step 92) and comparing the "length" of the typed string entry with the "length" of the respective Key entries in the Entry Table Lexicon 12B (Step 93). Referring back to decisional Step 89, if a "negative" comparison between the hash-coded typed string entry and the Hash Code Lexicon 12A entries is made, no further comparison of the string entry against the Entry Table Lexicon 12B is made, since the hash code comparison indicates that there are no Key entries within the Entry Table Lexicon 12B that will correspond with the typed string entry. If such a "negative" comparison is made, and if there had been a valid punctuation determination via Step 82, a "1" is added back to the Key count and the "saved" punctuation is cleared (Steps 90 and 91). If no valid punctuation was present (from Step 82), direct exit from the process is made via Steps 90 and 101.

When the Entry Table Lexicon 12B has been entered (Step 93, and decisional Step 94), the "length" of the entered typed string is successively compared with the respective lengths of the Keys stored within the Entry Table Lexicon 12B (by comparing the Key Length Segment 42 (see FIG. 4)) of the table entries. If the length of the typed string differs from that of the Key presently being compared, the process scans to the next entry (Step 95) and repeats the comparison Steps 93 and 94 until the entries of the table are exhausted (Step 96), or until a favorable comparison of the entered string length and that of a Key within the Entry Table Lexicon 12B is made. In such event, the typed entry string and that Key having the same length, are compared on a character by character basis (Step 97). If the comparison shows that the entered string differs in any way from the Key with which it is being compared (decisional Step 98), the process continues scanning the Key entries in the Entry Table Lexicon 12B until the next entered Key having the same length as the entered string is found, and the comparison Steps 97 and 98 are repeated. If comparison of all of the Key entries within the Entry Table Lexicon 12B is made, without finding a one-for-one comparison with the entered typed string exit from the process is achieved by means of Steps 96 and 101. If, on the other hand, a one-for-one comparison of the entered typed string and a Key in the Lexicon 12B is found (decisional Step 98), then the Replacement Text 41 (see FIG. 4) identifiably associated with that Key 40 for which identical comparison was found, is copied over and replaces the characters of the typed ASCII string that were the subject of comparison in this procedure (Step 99). Such "replacement" occurs automatically, without any operator intervention. Finally, if the Key had been followed by a valid punctuation (Step 82) that had been saved by Step 83, such punctuation character(s) is appended to the end of the copied Replacement Text. A favorable comparison and replacement having been made, exit from the comparison process is effected through the Step 101.

When an operator types characters or text with the aid of a word processor having one or more Key and Replacement Text entries operatively stored within Memory Lexicons 12A and 12B according to this invention, he will be unaware of the operations outlined above with respect to the FIG. 6 comparison process. What he will visually perceive on the Display Monitor 16.1 is the entry of exactly those characters which he is typing on the typewriter keyboard. As soon as he depresses the "Space Bar" or "Carriage Return", however, if that last entry immediately preceding the "Space" or "Carriage Return" identically compares with one of the prerecorded Keys in the Memory Lexicons 12A and 12B, those characters he just typed will be immediately replaced by the Replacement Text corresponding to that Key with which his entry is identically associated. Since the comparison function as performed by the method and apparatus of this invention takes place in a relatively small amount of time compared with the time required by the operator to make keystroke entries, the Replacement Text appears on the Display monitor 16.1 virtually simultaneously with activation of the "Space Bar" or "Carriage Return" by the operator.

While a particular method and apparatus has been utilized in describing this invention, other modifications of the invention will be apparent to those skilled in the art in light of the foregoing description. This description is intended to provide specific examples of individual embodiments clearly disclosed by the present invention. Accordingly, the invention is not limited to the described embodiments, or to the use of specific elements or process steps or techniques therein. All alternative modifications and variations of the present invention which fall within the broad scope of the appended claims are covered.

I claim:

1. A speed typing method for word processing apparatus of the type having an input keyboard, a central processor and memory, comprising the steps:
    (a) storing at least one encoded Key in a first lexicon of the memory, said Key comprising one or more alphanumeric keyboard entered characters represented on those input pads of the keyboard comprising a standard typewriter keyboard;
    (b) storing in said first lexicon of said memory a Replacement Text uniquely identifiably associated with each of said stored Keys, said Replacement Text comprising one or more alphanumeric characters;
    (c) storing a probabilistic representation of each of said Keys in a second memory lexicon;
    (d) monitoring operator entries typed on said standard typewriter keyboard;
    (e) automatically comparing said monitored operator entries with said stored Keys, said comparison step being automatically initiated by the operator entries typed on said standard typewriter keyboard without operator initiation of special function pads outside of said standard keyboard being required; said comparison step further comprising:
        (i) converting said operator entry into a probabilistic representation according to the same technique used to store the probabilistic representation of said Keys in said second memory lexicon;

(ii) comparing the probabilistic representation of said monitored operator entry with those of said Keys stored in said second memory lexicon; and (iii) subsequently comparing said monitored operator entry with said Keys stored in said second memory lexicon only when said first performed probabilistic comparison indicates a high likelihood that said second memory lexicon includes a Key corresponding to said monitored operator entry;

(f) identifying that said stored Key that is the same as said compared operator entry; and (g) replacing said compared operator entry with that stored Replacement Text identifiably associated with said identified Key.

2. The method as recited in claim 1, wherein the steps of converting said operator entry and said Keys into probabilistic representations, use hash-coding techniques.

* * * * *